Feb. 17, 1953   E. C. BALLMAN   2,629,031
ELECTROMAGNETIC SWITCH
Filed Aug. 17, 1946   3 Sheets-Sheet 1
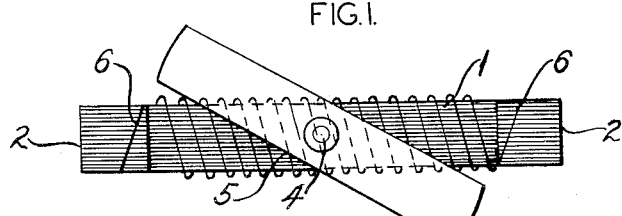
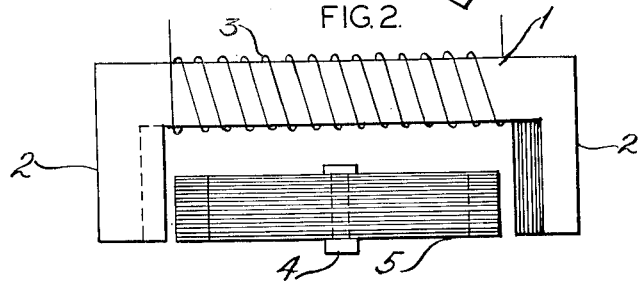
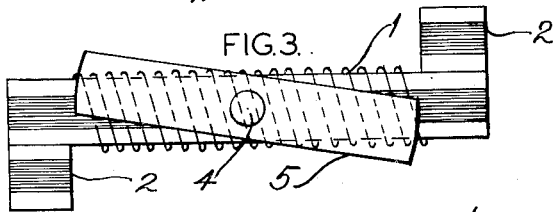
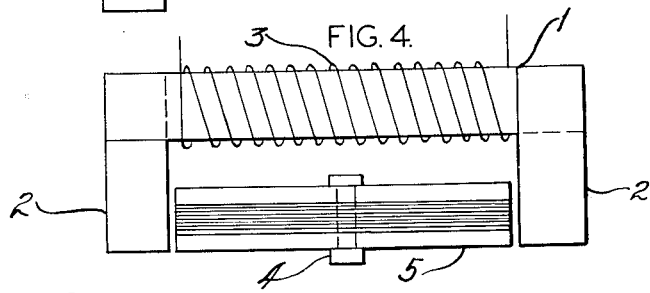
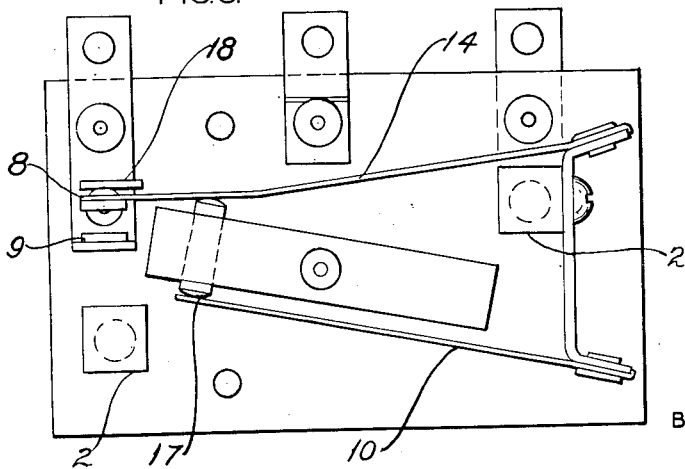
INVENTOR:
EDWIN C. BALLMAN,
BY Brunniga & Sutherland
ATTORNEYS.

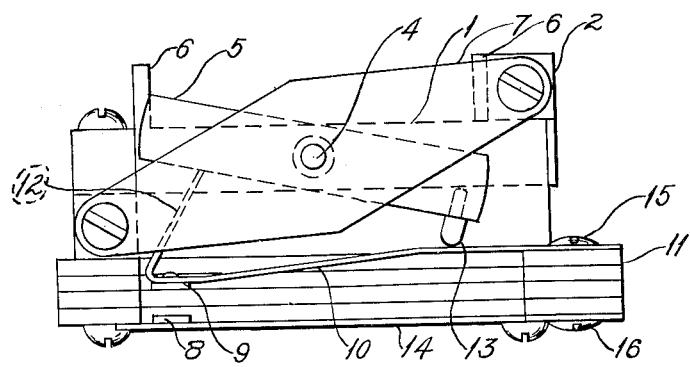
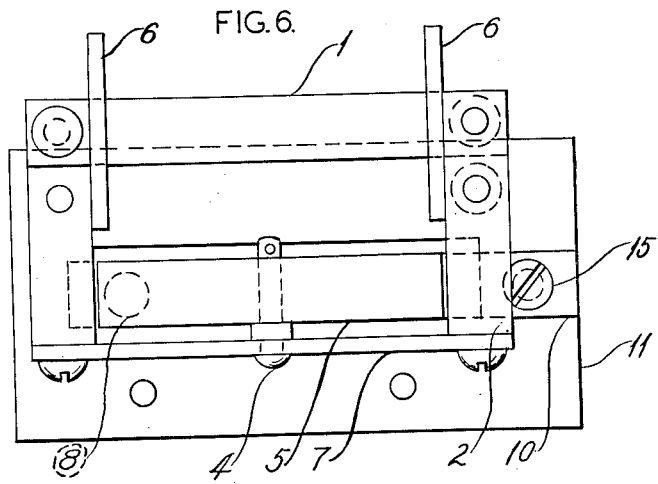
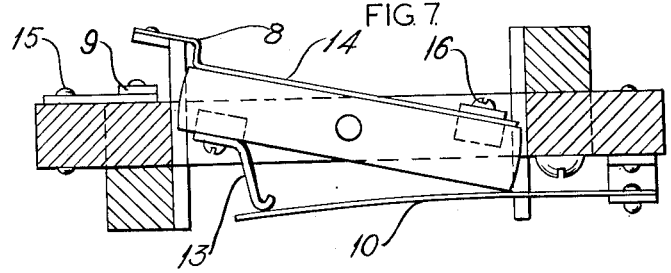
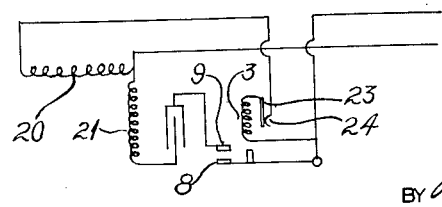

Patented Feb. 17, 1953

2,629,031

UNITED STATES PATENT OFFICE 2,629,031

ELECTROMAGNETIC SWITCH

Edwin C. Ballman, Clayton, Mo., assignor to Ballman Engineering Company, Clayton, Mo., a corporation of Missouri Application August 17, 1946, Serial No. 691,360

6 Claims. (Cl. 200—87)

This invention relates to switches, and more particularly to switches designed for the control of dynamo-electric machinery, although in many respects it is adapted for general application.

In some classes of control of electrical equipment it is necessary to close an electrical circuit when the current in the actuating winding or coil reaches some definite value and to then open the circuit when the current falls to another definite value. An ordinary electro-magnetic switch is liable, however, to set up vibrations at the contacts, particularly in the case of alternating current; this not only causes noise, but it is difficult to calibrate the switch so that it operates at definite current values. In order to make a switch fulfill the above requirements and be balanced in any position, it is desirable that the armature be pivoted, preferably at the center, in order to move into and out of the magnetic field set up by the actuating coil. Furthermore, in order to reduce eddy current losses, the core should be laminated.

In the operation of the electric motor, particularly of the split-phase type there will be large current flow, particularly in the main winding when the rotor is locked, and this is liable to cause damage or burning out of the main winding.

One of the objects of this invention is, therefore, to provide switching means of the character described which will overcome the disadvantages of previous constructions.

Further objects will appear from the detailed description in which will be set forth a number of illustrative embodiments of this invention; it is to be understood, however, that this invention is susceptible of various embodiments within the scope of the appended claims.

Generally stated, and in accordance with an illustrative embodiment of this invention, the switch comprises a core having a winding thereon and having a laterally projecting pole; an armature is arranged along the core and is pivoted to move into the field of the pole and contacts are adapted to cooperate by such movement. The cooperating faces of the core and of the armature are so shaped that the approaching corner of the armature moves away from the face of the pole as the armature moves into the field. A switch of the character described, made in accordance with an illustrative embodiment of this invention, may be connected with its actuating coil in circuit with the running winding and with its contacts in circuit with the starting winding of a split-phase motor. A thermo-electric means may be provided in circuit with the actuating coil and affected by the heat generated by the coil for opening the circuit thereof.

In the accompanying drawings:

Figure 1 and Figure 2 are side view and top view, somewhat diagrammatic in form, illustrating a type of core and armature embodying this invention;

Figure 3 and Figure 4 are views similar to Figures 1 and 2, but illustrating another embodiment of this invention;

Figure 5 and Figure 6 are views similar to Figures 3 and 4, but illustrating more completely a switch embodying this invention;

Figure 7 and Figure 8 are views similar to Figure 5 and illustrate other embodiments of this invention;

Figure 11 is a diagram of a motor circuit showing the application of this invention thereto.

Figure 9:
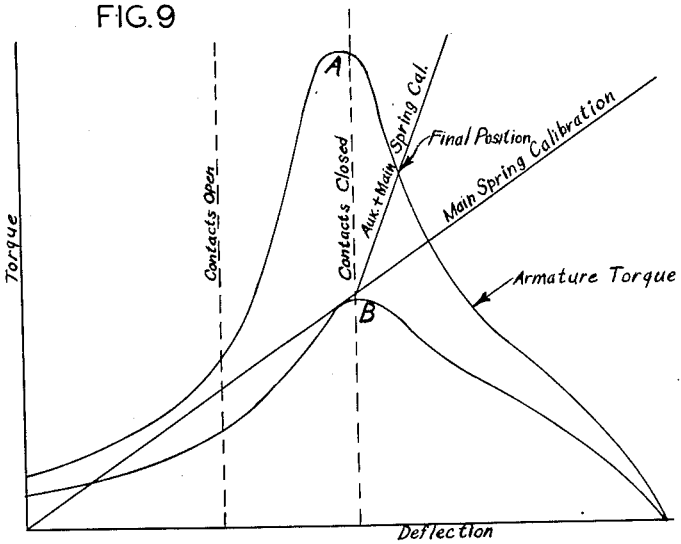
Figure 9 is a torque diagram, illustrating the operation of the embodiments of Figures 5 and 6.

Referring to the accompanying drawings, and more particularly to Figures 1 and 2, which disclose the magnetic circuit, I designates a core having laterally projecting poles 2 and provided with the winding or coil 3; the core and its poles being laminated. Pivoted, in this embodiment, between near its ends at 4 (support not shown) is an armature 5 arranged along the core and movable into the field of the poles; and this armature is also laminated. The construction is such that when current traverses the coil 3, the armature will move into the field and align itself therewith. Accordingly, by providing the core and armature with contacts the circuit can be closed and by providing a spring engaging the armature to counteract the field torque, the armature will be moved back to open the circuit when the current in the coil drops.

In order that a switch of the character described may have a suitable snap action both in closing and opening the contacts, it is necessary that as the armature moves into the field the field torque increase steeply to a peak and thereafter fall off rapidly, as the armature approaches the center position. In order to obtain this desirable torque the cooperating faces of the core and of the armature should be so shaped that the approaching corner of the armature moves away from the face of the pole as the armature moves into the field. This can be accomplished by shaping the inside faces of the poles as shown at 6. Such a construction is, however, difficult from the manufacturers' standpoint, in that it requires lamina of different shapes or the cutting of the lamina accurately after the core has been assembled.

Referring now to Figures 3 and 4, the similar parts have been designated by similar reference characters, as in Figures 1 and 2, and while the core and the armature are again laminated, the structure is modified in the following respects. The poles are displaced laterally of the core and in the direction of the movement of the armature. This construction is, therefore, such that the approaching corner of the armature moves away from the face of the pole as the armature moves into the field, in order to attain the desired torque curve. The lamina are, however, rectangular in shape, so as to facilitate the construction. In this embodiment, furthermore, the laminations of the core and of the poles thereof and also of the armature are of different thicknesses, as shown. This causes eddy currents to be set up in the thicker and thinner laminations which are sufficiently different in phase so that the magnetism does not drop to zero in the cycle as it does in the above noted construction laminations shown in Figures 1 and 2. This results in reduced vibrations at the contacts. Indeed, in very small switches, it is found that the core and armature may be made solid with little vibration and the heating in such small switches is low enough to be satisfactory.

Figures 5 and 6 show a particular embodiment of this invention in which similar parts are indicated by the same reference numerals as in Figures 3 and 4. The core has discs 6 forming the ends of the spool to receive the coil (not shown) and the armature is mounted in a plate 7 of non-magnetic material, such as brass, fixed to the core. The contacts are shown at 8 and 9, respectively. Contact 9 is mounted on the spring strip 10, fixed at one end to a base 11 of insulating material and this has a part 12, one end bearing against the armature, while the other end of the armature has a lug 13 which may also bear against the spring. This spring is arranged to set up a torque counter to the field torque. In this embodiment the contact 8 is mounted on the end of another spring 14 fixed at its end to the base. Terminal connections may be made at 15 and 16, respectively.

Figure 9 shows a torque-deflection relationship of the switch shown in Figures 5 and 6. When current traverses the actuating coil, the field torque rapidly rises with movement of the armature, to a maximum and then rapidly drops to a minimum as the armature moves into the center of the field and this is due to the construction previously described. This is counteracted by the torque of the main spring 10 and the auxiliary spring 14. It should be noted that in Figures 9 and 10 the lines representing the torque produced by the springs, though plotted, above the horizontal axis, represent negative-, or counter-torque which must be overcome by the field torque to close the switch. When the contacts are open the main spring only acts, but as the contacts close at approximately the maximum torque point the auxiliary spring 14 adds its counter-torque, and the contacts vibrate in "final position" as shown. This auxiliary spring is, however, resilient enough to take up the vibration of the armature when it reaches final position. As the actuating current is reduced, the peak "A," Fig. 9, drops to the point "B" at which point the switch snaps open. The condition for the snap opening action is that the peak of the current becomes tangent to the main spring calibration line at the point "B," as shown in Figure 9. In order to attain this condition it is necessary that the "contact closed position" occur before the peak is reached or the "contact closed" lines should be moved to the left on Figure 9. A switch as above may have the contacts arranged for normally closed as well as normally open operation. The armature is shown with its end face on an arc, but it may be straight, which causes the torque to drop off at a still steeper angle.

The embodiment shown in Figure 7 is similar to that shown in Figure 5, with the exception that the main spring 10 does not carry contact 9 and the part 13 is on the armature. The contact 9 is, in this embodiment, on base structure while the contact 8 is on spring 14, secured at its ends to the other end of the armature. The current leads 15 and 16 are as shown. The operation of this embodiment is similar to that of Figures 5 and 6, the main spring functioning to set up the counter-torque until the contacts are closed, and thereafter the auxiliary spring 14 operates to set up an additional counter-torque. The torque diagram will be substantially as shown in Figure 9.

In Figure 8 where the poles 2 are connected by a yoke, not shown but which is constructed as in Figure 5. The main spring 10 again does not carry current and engages one end of the pin 17 in the armature. The auxiliary spring 14 engages the other end of the pin 17 and this carries the contact 8 cooperating with the stationary contact 9. In this embodiment spring 14 "bucks" spring 10, that is, the torque applied to the armature by the auxiliary spring is in the same direction as the field torque, while the main spring applies a torque opposite to that of the field torque. The auxiliary spring takes against the stop 18, against which it is pressed by the main spring.

Figure 10:
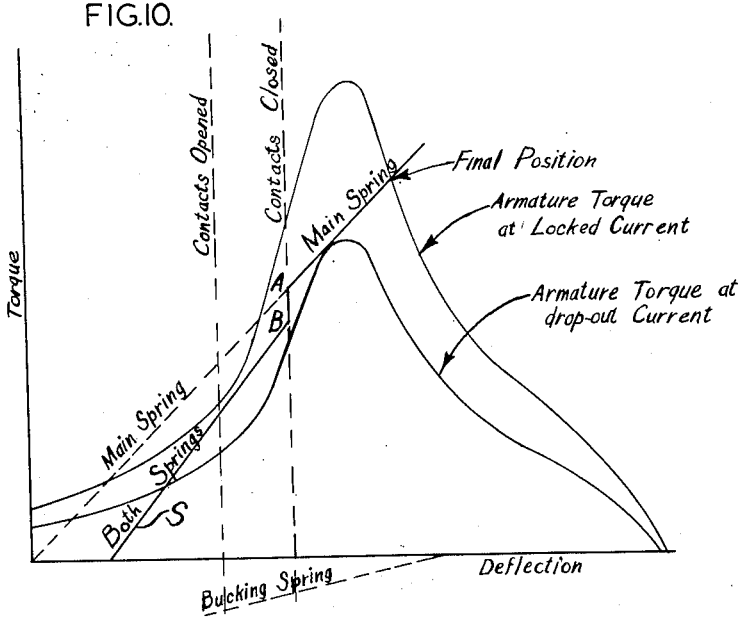
Figure 10 is a view similar to Figure 9, but illustrating the operation of the embodiment of Figure 8.

In Figure 8, as the armature moves under the action of the field it will first be assisted by the auxiliary spring, so as to subtract from the torque applied by the main spring; however, after the contacts are closed the auxiliary spring becomes inactive with respect to the armature but provides contact pressure for the contacts 8 and 9. Figure 10 shows the action of both springs in this respect, where the torque-producing action on the armature of the main spring and bucking spring are shown in dotted lines, while line S shows the resultant torque due to the main and bucking springs. It will be seen that after the contacts are closed the action of the main spring alone is active on the armature, the torque due to the main spring increases after the contacts are closed.

In accordance with this invention, therefore, means in the form of the springs is provided for applying to the armature a torque opposed to that applied by the field which is adapted to reverse the movement of the armature when the field torque falls below that of the means torque. The counter-torque is opposed to that applied by the field, but is less than the normal peak torque thereof. Furthermore, the springs are so constructed as to apply first a slightly increasing counter-torque, followed by a rapidly increasing counter-torque. The springs provide a series of means for applying to the armature torques of such value that the resultant torque will be opposed to, but less than the normal peak applied to the armature by the field.

Referring now to Figure 11, 20 designates the running winding and 21 the auxiliary winding of a split-phase motor. 8 and 9 are contacts in the starting winding circuit which are controlled by a coil 3 in the running winding circuit. The coil and contacts may be corresponding parts of any of the switches heretofore described. When the current is turned on and traverses the running winding, it will cause the contacts 8 and 9 to close, in order to cause the current to traverse the starting winding. When the motor comes up to speed and the current in the running winding drops the switch contacts 8 and 9 will open.

In order to provide means for protecting a motor circuit, particularly when the motor becomes locked, the following means are provided. The coil 3 is provided with a metallic plate 23, which is in circuit therewith, and close thereto, so as to be effected by the heat. Contacting with this plate is a contact 24, secured thereto by solder which will melt at the boiling point of water, that is, 100° C. Should the motor become locked, so that the current traversing the winding will cause it to heat up to the melting or softening point of the solder, the latter will melt. By making the contact 24 in the form of a spring which normally tends to move to the right, Figure 11, the circuit including the running winding will open. Moreover, upon opening of that circuit the switch contacts 9 will also open, so as to open the circuit of the starting winding. In order to secure protection the cross-section of the core and the winding are so made that the locked current of the main winding of the motor will heat the core in the coil 3 to above 100° C. inside of two or three minutes.

Having thus described the invention, what is claimed and desired to be secured by Letters Patent is:

1. A switch of the character described comprising means including a core for setting up a magnetic field, said core having a pair of laterally projecting poles, an armature pivoted at its center between said poles for movement into said field, said poles and said armature being so formed and positioned with respect to one another that the end faces of said armature first approach and then move away from the adjacent faces of said poles to vary the strength of said field during such movement, said field operating on said armature as it moves into said field to apply a rapidly rising followed by a rapidly falling torque, a main spring mounted to bias the said armature away from the field, an auxiliary spring mounted to bias the said armature toward said field through a part of the travel of said armature but with less torque than said main spring, and contacts normally held apart by said armature and biased to meet when said armature is at the limit of its travel toward said field.

2. A switch of the character described comprising means including a core for setting up a magnetic field, said core having a pair of laterally projecting poles, an armature pivoted at its center between said poles for movement into said field, said poles and said armature being so formed and positioned with respect to one another that the end faces of said armature first approach and then move away from the adjacent faces of said poles to vary the strength of said field during such movement, said field operating on said armature as it moves into said field to apply a rapidly rising followed by a rapidly falling torque, a main spring mounted to bias the said armature away from the field, an auxiliary spring mounted to bias the said armature toward said field through a part of the travel of said armature but with less torque than said main spring, said auxiliary spring carrying a contact positioned to meet a second contact and to be held thereagainst solely by the force of said auxiliary spring when said armature is at the limit of its travel toward said field.

3. A switch of the character described comprising a core having a winding thereon and having laterally projecting poles one of said poles being displaced above the horizontal plane of said core the other of said poles being displaced below the horizontal plane of said core, an armature pivoted at its center for rotation into and out of the field of said poles said poles being formed with flat faces facing said armature, said armature having end faces with edge portions which at first approach and then recede from said pole faces, so that said field operates on said armature as it moves into said field to apply a rapidly rising followed by a rapidly falling torque, contacts normally held apart by said armature and arranged to meet when said armature is at the limit of its travel toward said field and means for applying to said armature a torque opposed to that applied by said field.

4. The switch of claim 3 in which one or both said core and said armature have a portion thereof of laminal structure and a remaining portion of non-laminal structure adapted to shift the phase of an alternating magnetic flux in one of said portions relatively to that in the other.

5. A switch of the character described comprising a core having a winding thereon and having laterally projecting poles one of said poles being displaced above the horizontal plane of said core the other of said poles being displaced below the horizontal plane of said core, an armature pivoted at its center for rotation into and out of the field of said poles, said poles being formed with flat faces facing said armature, said armature having end faces with edge portions which at first approach and then recede from said pole faces, so that said field operates on said armature as it moves into said field to apply a rapidly rising followed by a rapidly falling torque, a main spring mounted to continually bias the said armature away from the field, an auxiliary spring mounted to bias the said armature toward said field through a part of the travel of said armature but with less torque than said main spring, said auxiliary spring carrying a contact positioned to meet a second contact and to be held thereagainst solely by the force of said auxiliary spring when said armature is at the limit of its travel toward said field.

6. The switch of claim 5 in which one or both said core and said armature have a portion thereof of laminal structure and a remaining portion of non-laminal structure adapted to shift the phase of an alternating magnetic flux in one of said portions relatively to that in the other.

EDWIN C. BALLMAN.

(References on following page)

REFERENCES CITED

The following references are of record in the file of this patent:

UNITED STATES PATENTS

| Number | Name | Date |
|---|---|---|
| 541,471 | Corey | June 25, 1895 |
| 714,607 | Potter | Nov. 25, 1902 |
| 792,860 | Sundh et al. | June 20, 1905 |
| 827,269 | Struble | July 31, 1906 |
| 928,516 | Hellmund | July 20, 1909 |
| 989,018 | Lindstrom | Apr. 11, 1911 |
| 1,053,340 | Ziegler | Feb. 18, 1913 |
| 1,104,077 | Smith | July 21, 1914 |
| 1,186,012 | Lindquist | June 6, 1916 |
| 1,219,008 | Kennington | Mar. 13, 1917 |
| 1,332,040 | Hengstenberg | Feb. 24, 1920 |
| 1,398,463 | Lee | Nov. 29, 1921 |
| 1,491,396 | Hall | Apr. 22, 1924 |
| 1,492,691 | Leich | May 6, 1924 |
| 1,692,486 | Cohn | Nov. 20, 1928 |
| 1,757,703 | Curtis | May 6, 1930 |
| 1,763,003 | Mead | June 10, 1930 |
| 1,764,658 | Stoecklin | June 17, 1930 |
| 1,920,135 | Allen | July 25, 1933 |
| 1,963,825 | Chilton | June 19, 1934 |
| 1,974,188 | Martin | Sept. 18, 1934 |
| 2,020,398 | Chilton | Nov. 12, 1935 |
| 2,021,199 | Pearce | Nov. 19, 1935 |
| 2,040,389 | Lamb | May 12, 1936 |
| 2,324,370 | Debrey | July 13, 1943 |
| 2,428,784 | Cole | Oct. 14, 1947 |
| 2,438,609 | Juhasz | Mar. 30, 1948 |

FOREIGN PATENTS

| Number | Country | Date |
|---|---|---|
| 145,225 | Germany | Oct. 20, 1903 |
| 292,261 | Germany | June 3, 1916 |
| 592,609 | France | 1925 |